D. M. DONEHOO.
Smut Mill.
No. 19,629.
2 Sheets—Sheet 1.
Patented March 16, 1858.
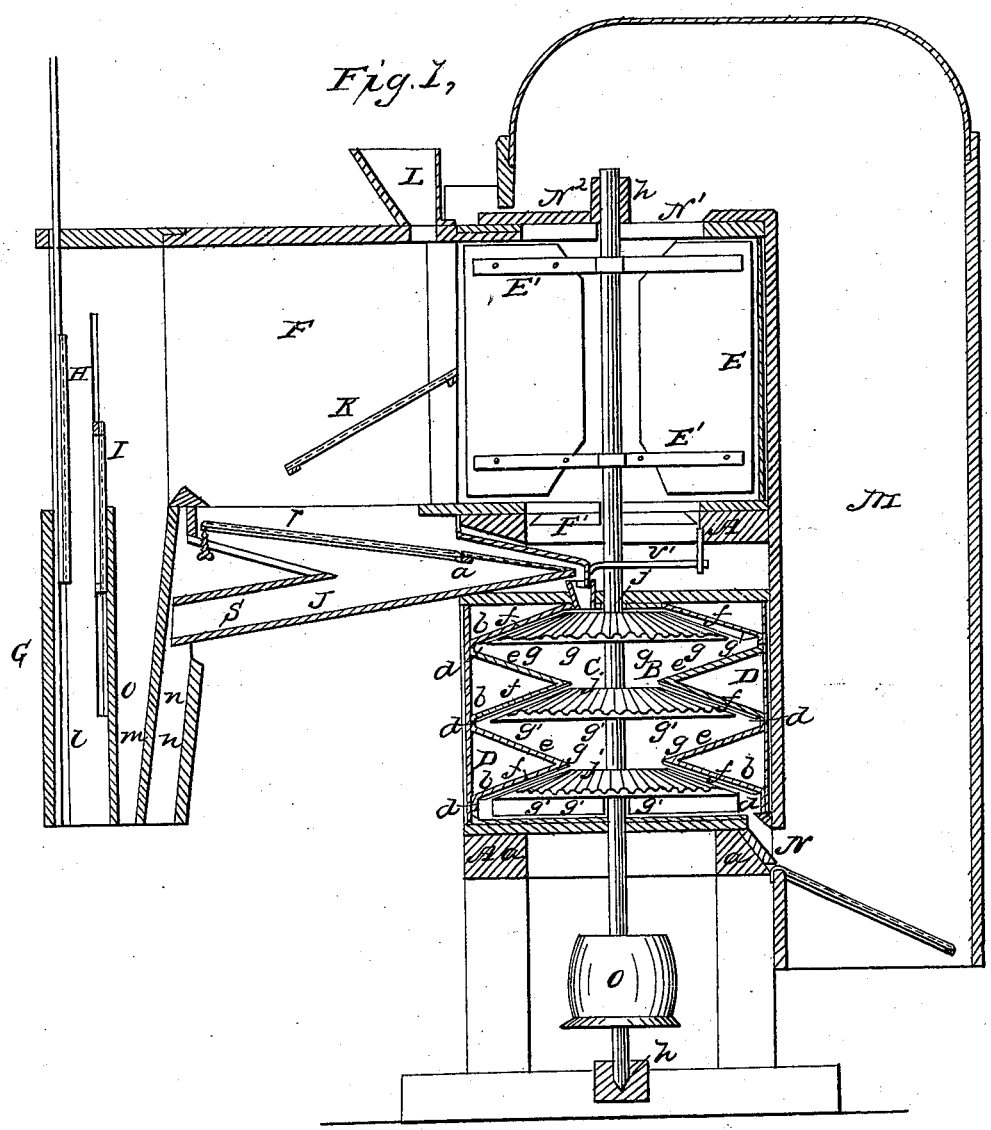

D. M. DONEHOO.
Smut Mill.
No. 19,629.
2 Sheets—Sheet 2.
Patented March 16, 1858.
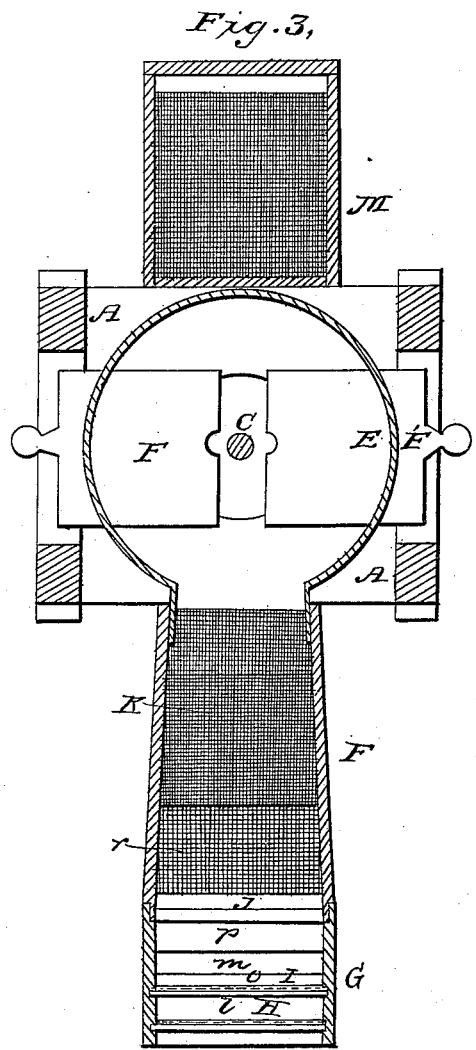
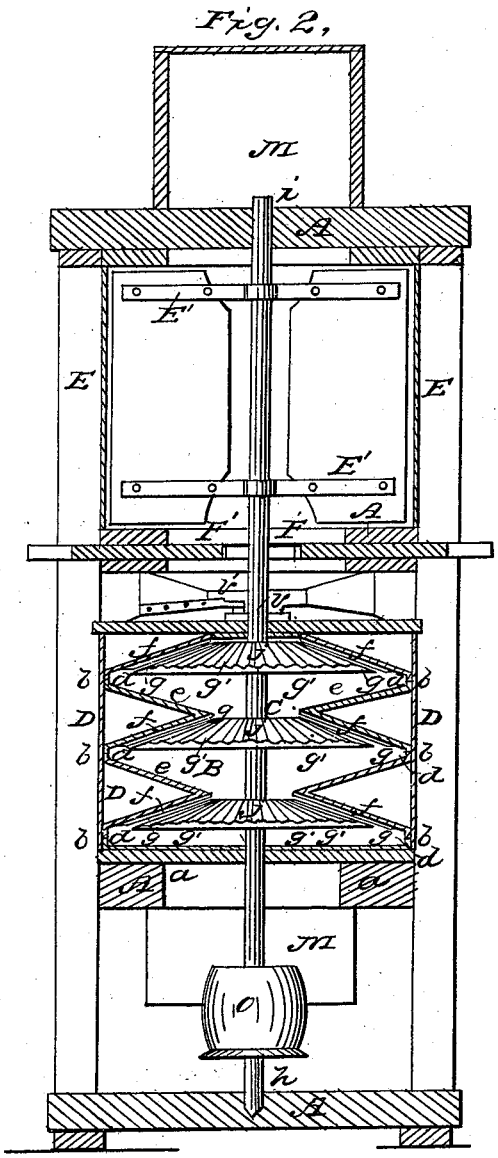

UNITED STATES PATENT OFFICE.

DANIEL M. DONEHOO, OF HOOKSTOWN, PENNSYLVANIA.

SEPARATOR AND SMUT-MACHINE.

Specification of Letters Patent No. 19,629, dated March 16, 1858.

*To all whom it may concern:*

Be it known that I, DANIEL M. DONEHOO, of Hookstown, in the county of Beaver and State of Pennsylvania, have invented a new and useful Improvement in Combined Separators and Smut-Machines; and I do hereby declare that the following is a full, clear, and exact description of the same, reference being had to the accompanying drawings, forming part of this specification, in which—

Figure 1, is a vertical longitudinal section of the same. Fig. 2, is a vertical transverse section of the same in the line $x$, $x$, of Fig. 1. Fig. 3, is a horizontal section of the same in the line $y$, $y$.

Similar letters of reference in each of the several figures indicate corresponding parts.

The object of my invention is to combine in the simplest possible manner in one machine, the four well known functions necessary to effectually clean wheat of all foreign substances and render it fit for grinding, to wit: 1st, a capability of separating all the lighter and foreign substances by blast; 2nd, of separating by screening or sieving those foreign substances whose specific gravity will not allow of their passing off by the action of a proper blast; 3rd, of depriving the grain of all smut which may not have been blown off or separated before arriving at the scouring cylinder and also scouring and polishing the grain, and 4th by depriving the wheat by a light suction as fast as it passes from the scouring cylinder, of dust, &c., without lifting and interfering with its discharge.

The nature of my invention consists, 1st, in the arrangement of a horizontal flaring blast spout for separating the wheat from foreign substances, with a vertical spout furnished with screening and separating partitions or sliding gates formed partly of wire gauze, and made adjustable, said spout also being arranged at right angles or nearly so to the horizon on the outer end of the blast spout as presently set forth. By this feature of my invention, the wheat is perfectly separated from the foreign substances and the different qualities of screenings are cleaned and all perfectly separated or classed and in case the specific gravity of different kinds of wheat requires a smaller escape for dust and chaff in order to prevent the throwing out of the screenings, the passage can be decreased in size by raising the screening gates more or less.

The nature of my invention consists, 2nd, in a vibrating shoe having two reverse incline chutes, one of which is adjustable and made of wire or perforated plate, with a chute below the hopper, and with the separating or screening spout, and the scouring cylinder in the manner presently described, whereby the cockle and such foreign substances as from their specific gravity cannot possibly pass off with the screenings are separated from the wheat before entering the scouring cylinder. The height of the machine is also reduced, owing to the bottom of the shoe being itself adjustable to suit the amount of cockle contained in the wheat in place of the shoe. If the shoe were adjustable a greater space necessarily must exist between the fan and scouring cylinders, in order to allow for the adjustment.

The nature of my invention consists, 3rd, in having the radially fluted revolving scouring plates shaped on top in the form of truncated cones, and to operate in combination with stationary concentric prismatic rings, the under surface of which is fluted radially, and the upper surface made smooth and serving as chutes to the scouring plates. By beveling the plates downward, the immediate discharge, horizontally, of the wheat by centrifugal force, is avoided, and all the advantage of retarding its escape secured, and at the same time, after the wheat has been fully acted upon, its gravity is made available to assist in its gradual discharge, instead of being obliged to employ power to lift it up and over incline planes as in the patent of Turner, 1855.

The nature of my invention consists, 4th, in the particular arrangement shown of the screening spout, blast spout, fan with valves, cockle chute, scouring apparatus and dust suction pipe, whereby all the parts are brought into a small compass, and only one driving shaft, and one pulley, are necessary, and the four necessary actions to clean wheat combined in one machine.

To enable others skilled in the art to make and use my invention, I will proceed to describe its construction and operation.

A, is the frame of the machine.

B, is the scouring chamber arranged within the frame on the lower cross pieces $a$, $a$. This chamber is formed of a series of castings matched together as shown at $b$, $b$. These castings are of such form that when put together, the scouring chamber appears as being formed partly, alternately, of a series of short sections $d, d$, of a cylinder, and of a series of hollow truncated conical sections $e, e, f, f$, every alternate one of which is inverted. The inverted sections or conical concaves $e, e$, are made plane on their inner surface, while the contrary positioned concaves $f, f$, are fluted radially on their outer surface with semi-circular flutes $g$.

C, is a vertical shaft passing up through the scouring chamber and having its bearings $h, i$, at top and bottom of the frame. Fast on this shaft, so as to come within each of the conical concaves, a conical scouring plate $j$, is arranged. These scouring and polishing plates are fluted radially on their periphery with semi-circular flutes $g^1$. The chamber, with the scouring plates thus arranged within it, is incased within an outer cylinder D, as shown in the drawings. By thus forming the scouring plates conical, and the chamber in the manner specified, the grain is subjected to a very large scouring surface, retarded in its progress, and its gravity still made available to assist in its escape as fast as acted upon.

E, is the fan cylinder, arranged on the upper end of the frame. Within this case, the fan $E^1$ is placed, being arranged on a vertical shaft C. The fan-case terminates in a horizontal blast spout F, which is made gradually flaring laterally as it approaches to its discharge end. This fan and spout serve for separating the wheat from the screenings very perfectly.

$F^1, F^1$, are two valves arranged at the bottom of the fan case for the purpose of admitting more or less air to the fan accordingly as it is desired to have the strength of the blast.

G, is the vertical spout for separating the different qualities of screenings from one another. This spout is arranged in the end of the blast spout, and is closed at top, but open, to a certain extent, at bottom, and back and front, in the manner shown. Its lower end is divided into three passages $l, m, n$, by means of partitions $o, p$.

H, I, are two sliding screening gates, formed partly of wire gauze. These gates are made adjustable and serve for separating the different qualities of screenings from one another as soon as the wheat is separated therefrom. By having the screens or gates adjustable, they can be regulated in height to suit the specific gravity of different kinds of wheat being operated upon.

J, is the shoe which receives the wheat as it falls through the blast from the wire gauze chute K, of the hopper L. This shoe is formed with two reverse inclines $r, s$, which form two spouts, the bottom of one of which is formed of wire gauze or perforated zinc, and is adjustable itself, by means of a set screw, it being hinged at $u$. This shoe serves two offices. One is to conduct the wheat into the scouring chamber and the other is to separate by its wire gauze bottom the cockle from the wheat, and conduct it into one of the passages of the screening spout G. By having the wire gauze bottom of the shoe adjustable, it can be set more or less inclined so as to suit wheat containing a large or small amount of cockle; if much cockle is in the wheat the wire gauze bottom requires to be less inclined so as to insure its separation from the wheat by keeping it longer in contact with the separating surface. Another advantage is that the shoe itself does not require to be adjusted, and consequently the space between the fan case and the scouring chamber does not require to be great in order to allow for adjustments. The vibration of the shoe is effected by means of a cam or projection $v$ on the driving shaft, said projection striking the rod $v^1$, in the revolution of the shaft.

M, is a suction spout leading up from near the bottom of the frame alongside the scouring chamber, and terminating over the fan case, being allowed to communicate with the scouring chamber by a passage N, and with the fan case by means of passages $N^1$, one of which is covered with a valve $N^2$, said valve serving to regulate the draft through the spout and thus avoid a lifting up of the grain through the spout by too great suctions. At the bottom of this spout there is as usual an inclined wire gauze screen or chute for the grain to pass over in discharge and be deprived, in its passage, of its dust by the suction through the spout M. It will be noticed that the communication of the spout M, with the scouring cylinder, is direct.

The motion, to the shaft of the scourers, the fan and cockle shoe, is communicated by means of a belt passed around the pulley O.

What I claim as my invention and desire to secure by Letters-Patent, is—

1. The arrangement of a horizontal, flaring blast spout F, with a vertical spout G, furnished with sliding adjustable screening gates formed of wire gauze and with separating partitions H, I, said spout also being arranged at right angles or nearly so to the horizon on the outer end of the blast spout, substantially as and for the purposes set forth.

2. The arrangement of a vibrating shoe J, when made with two reverse incline chutes one of which is adjustable and made of wire or perforated plate with the chute K, and with the screening and separating spout G, and the scouring cylinder substantially as and for the purposes set forth.

3. The employment of radially fluted scouring plates *j* when shaped on top in the form of truncated cones, in combination with radially fluted stationary concentric prismatic rings *e, f*, substantially as and for the purposes set forth.

4. I claim the particular arrangement shown and described, of the screening and separating spout G, blast spout F, fan with valves double reverse incline cockle chute J, peculiar scouring apparatus B, and dust spout M, for the purposes set forth.

DANIEL M. DONEHOO.

Witnesses:
G. YORKE AT LEE,
H. H. YOUNG.